US006882941B2

(12) United States Patent
Nanaji et al.

(10) Patent No.: US 6,882,941 B2
(45) Date of Patent: Apr. 19, 2005

(54) TAMPER PROOF METER

(75) Inventors: Seifollah S. Nanaji, Greensboro, NC (US); Brent K. Price, Winston-Salem, NC (US); David S. Shuttleworth, Greensboro, NC (US)

(73) Assignee: Gilbraco Inc., Greensboro, NC (US)

( * ) Notice: Subject to any disclaimer, the term of this patent is extended or adjusted under 35 U.S.C. 154(b) by 142 days.

(21) Appl. No.: 10/225,369

(22) Filed: Nov. 6, 2002

(65) Prior Publication Data

US 2004/0088122 A1 May 6, 2004

(51) Int. Cl.$^{7}$ ................................................ G06F 19/00
(52) U.S. Cl. ......................................... 702/45; 702/100
(58) Field of Search ............................. 702/45, 50, 55, 702/84, 100, 188, 189; 700/228, 231, 232, 236, 237, 241; 73/251, 261, 861.77

(56) References Cited

U.S. PATENT DOCUMENTS

| | | | | | |
|---|---|---|---|---|---|
| 4,085,313 | A | * | 4/1978 | Van Ness | 235/381 |
| 4,319,128 | A | | 3/1982 | Dow, Jr. et al. | 235/61 PD |
| 4,410,949 | A | | 10/1983 | Huellinghorst et al. | 364/465 |
| 4,977,528 | A | | 12/1990 | Norris | 364/571.04 |
| 5,319,545 | A | | 6/1994 | McGarvey et al. | 364/403 |
| 5,400,253 | A | | 3/1995 | O'Connor | 364/442 |
| 5,423,457 | A | | 6/1995 | Nicholas et al. | 222/62 |
| 5,689,071 | A | | 11/1997 | Ruffner et al. | 73/861.84 |
| 5,734,851 | A | | 3/1998 | Leatherman et al. | 395/329 |
| 5,831,176 | A | | 11/1998 | Morgenthale et al. | 73/861.77 |
| 5,831,861 | A | * | 11/1998 | Warn et al. | 700/231 |
| 5,956,259 | A | | 9/1999 | Hartsell, Jr. et al. | 364/528.37 |
| 6,052,629 | A | * | 4/2000 | Leatherman et al. | 700/241 |
| 6,067,476 | A | | 5/2000 | Siler | 700/79 |
| 6,088,659 | A | | 7/2000 | Kelley et al. | 702/62 |
| 6,092,410 | A | * | 7/2000 | Kaehler et al. | 73/1.34 |
| 6,109,477 | A | | 8/2000 | Myers et al. | 222/1 |
| 6,213,172 | B1 | | 4/2001 | Dickson | 141/59 |
| 6,250,151 | B1 | * | 6/2001 | Tingleff et al. | 73/261 |
| 6,296,148 | B1 | | 10/2001 | Myers et al. | 222/71 |
| 6,360,138 | B1 | | 3/2002 | Coppola et al. | 700/231 |
| 6,381,514 | B1 | * | 4/2002 | Hartsell, Jr. | 700/236 |

* cited by examiner

*Primary Examiner*—Bryan Bui
(74) *Attorney, Agent, or Firm*—Withrow & Terranova PLLC

(57) ABSTRACT

A fuel dispenser with a flow meter prevents fraud in the form of flow meter replacement by storing a unique identifier in the memory associated with the flow meter. The unique identifier is stored in the memory of the fuel dispenser as well. Prior to each fueling transaction, the unique identifiers in the respective memories are compared. In the event that a match is not found, an alarm may be generated. A calibration factor may likewise be stored in both memories and compared concurrently with the unique identifiers. In an alternate embodiment, each element of the flow meter has a unique identifier which is compared prior to a fueling transaction.

24 Claims, 5 Drawing Sheets

TAMPER PROOF METER

FIELD OF THE INVENTION

The present invention relates to a technique to render fuel meters tamper resistant in a fuel dispenser.

BACKGROUND OF THE INVENTION

Fuel dispensers are equipped with flow meters that measure fuel as it is dispensed. The amount of fuel dispensed, as measured by the flow meter, is used to arrive at a total amount that the customer must pay to complete the transaction. In a perfect world, no one would have to worry about being cheated by dishonest individuals. Unfortunately, many individuals install fraudulent devices to cause the fuel dispenser to register dispensed fuel in amounts greater than actually dispensed, necessitating the need to provide counter measures to correct for these fraudulent activities.

Dishonest individuals may attempt to alter or replace the flow meter such that it indicates that more fuel has been dispensed than actually has been dispensed. This results in the customer paying for more fuel than they actually received. While many states have Bureaus of Weights and Measures which periodically test fuel dispensers for accuracy, such inspections may not be frequent enough to catch the perpetrators, or may include test points that are known and the fraudulent activities occur in such a fashion that the test points do not reflect the fraudulent activities.

Such fraud is of concern not only to the customers, but also to the companies that manufacture fuel dispensers. These companies do not wish to risk customer wrath or damage to the goodwill of their company by being associated with cheating fueling environments. However, these companies are usually not in a position to create hardware to catch the dishonest individuals. Thus, there is a demand in the fuel dispensing industry to provide ways to eliminate or catch fraud affected through the flow meter.

The assignee of the present invention also owns several patents relating to fraud prevention and detection, such as U.S. Pat. Nos. 6,109,477; 6,296,148; and 6,213,172, all of which are hereby incorporated by reference in their entireties. While each is adequate in its own manner, offering more choices to the fueling companies that brand fueling environments helps provide a competitive advantage while at the same time allowing redundancies to be created, thus increasing the likelihood that the fraud is detected and eliminated.

SUMMARY OF THE INVENTION

Prior to installation in a fuel dispenser, a flow meter is assigned a unique identifier. This identifier is embedded into the electronics of the flow meter. A calibration factor may also be generated during manufacturing and stored in the electronics. Once the meter is installed in a fuel dispenser, the dispenser electronics read the meter identification and calibration factor and store them in a memory where values cannot be changed or replaced manually.

Before starting a fueling operation, the dispenser electronics compare the meter identification and the calibration factor stored in the dispenser's memory with the meter identification and calibration factors stored in the flow meter's electronics to make sure that the flow meter has not been replaced.

When the flow meter must legitimately be replaced, such as after prolonged use has created pronounced wear on the components, after a failure, or the like, an authorized service representative of the fuel dispenser's manufacturer may be provided a password that allows the memory in the fuel dispenser to be accessed. Before the authorized service representative is provided the password, the service representative may have to prove that he is authorized to receive the password, especially in an instance when the password is delivered over a network (as opposed to in person). Such proof may be challenge and password, an employee number, or the like as needed or desired. The authorized service representative replaces the flow meter and reprograms the memory of the fuel dispenser to accept the new calibration factor and unique identifier of the new flow meter.

In the event that a match is not made prior to the commencement of a fueling transaction, the fuel dispenser may be shut down, an alarm may be generated, or the like as needed or desired.

In another embodiment, individual components within the flow meter may have unique identifiers. Exemplary components amenable to such an arrangement are the pickoff and pulser. These unique identifiers may be stored in the flow meter and the fuel dispenser for comparison as previously described.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
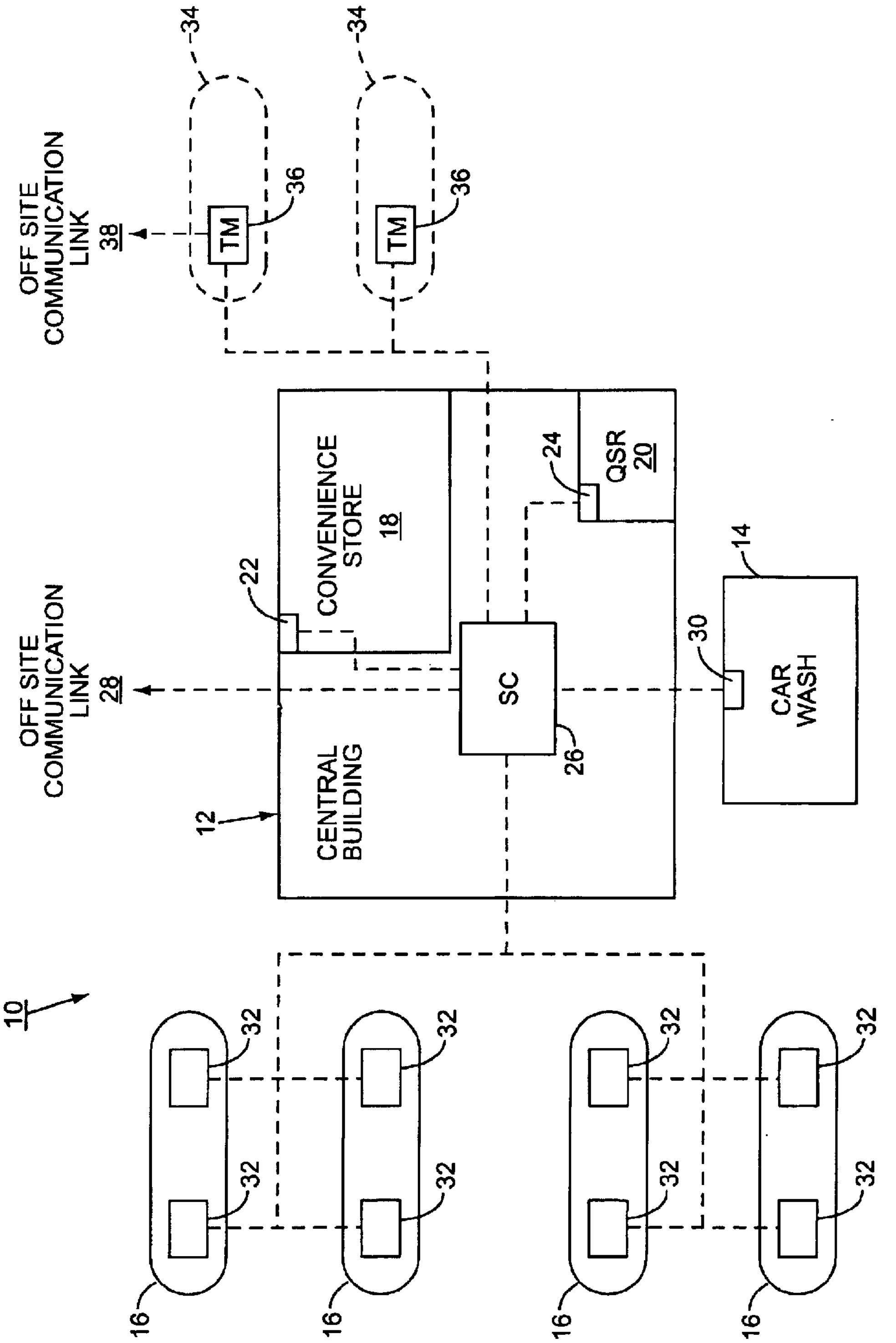
FIG. 1 PRIOR ART
FIG. 1 illustrates an exemplary fueling environment such as may use the present invention.

A conventional exemplary fueling environment 10 is illustrated in FIG. 1. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant (QSR) 20 therein. Both the convenience store 18 and the quick serve restaurant 20 may include a point of sale 22, 24, respectively. The central building 12 may further house a site controller (SC) 26, which in an exemplary embodiment may be the G-SITE® sold by Gilbarco Inc. of Greensboro, N.C. The site controller 26 may control the authorization of fueling transactions and other conventional activities as is well understood. The site controller 26 may be incorporated into a point of sale, such as point of sale 22, if needed or desired. Further, the site controller 26 may have an off site communication link 28 allowing communication with a remote location for credit/debit card authorization, content provision, reporting purposes, or the like, as needed or desired. The off site communication link 28 may be routed through the Public Switched Telephone Network (PSTN), the Internet, both, or the like, as needed or desired.

The car wash 14 may have a point of sale 30 associated therewith that communicates with the site controller 26 for inventory and/or sales purposes. The car wash 14 alternatively may be a stand alone unit. Note that the car wash 14, the convenience store 18, and the quick serve restaurant 20 are all optional and need not be present in a given fueling environment.

The fueling islands 16 may have one or more fuel dispensers 32 positioned thereon. The fuel dispensers 32 may be, for example, the ECLIPSE® or ENCORE® sold by Gilbarco Inc. of Greensboro, N.C. The fuel dispensers 32 are in electronic communication with the site controller 26 through a LAN or the like.

The fueling environment 10 also has one or more underground storage tanks 34 adapted to hold fuel therein. As such, the underground storage tank 34 may be a double walled tank. Further, each underground storage tank 34 may include a tank monitor (TM) 36 associated therewith. The tank monitors 36 may communicate with the fuel dispensers 32 (either through the site controller 26 or directly, as needed or desired) to determine amounts of fuel dispensed and compare fuel dispensed to current levels of fuel within the underground storage tanks 34 to determine if the underground storage tanks 34 are leaking.

The tank monitor 36 may communicate with the site controller 26 and further may have an off site communication link 38 for leak detection reporting, inventory reporting, or the like. Much like the off site communication link 28, off site communication link 38 may be through the PSTN, the Internet, both, or the like. If the off site communication link 28 is present, the off site communication link 38 need not be present and vice versa, although both links may be present if needed or desired. As used herein, the tank monitor 36 and the site controller 26 are site communicators to the extent that they allow off site communication and report site data to a remote location. In either event, the site communicators have logic programmed to perform the remote communication functions described herein. The software may be stored in a computer readable medium that may or may not be portable like a floppy disk as needed or desired. Alternatively, the logic could have the programming be a function of sequential hardware steps as is well understood.

For further information on how elements of a fueling environment 10 may interact, reference is made to U.S. Pat. No. 5,956,259, which is hereby incorporated by reference in its entirety. Information about fuel dispensers may be found in commonly owned U.S. Pat. 5,734,851 and 6,052,629, which are hereby incorporated by reference in their entirety. Information about car washes may be found in commonly owned U.S. patent application Ser. No. 60/380,111, filed 06 May 2002, entitled IMPROVED SERVICE STATION CAR WASH, which is hereby incorporated by reference in its entirety. An exemplary tank monitor 36 is the TLS-350R manufactured and sold by Veeder-Root. For more information about tank monitors 36 and their operation, reference is made to U.S. Pat. Nos. 5,423,457; 5,400,253; 5,319,545; and 4,977,528, which are hereby incorporated by reference in their entireties.

Figure 2:
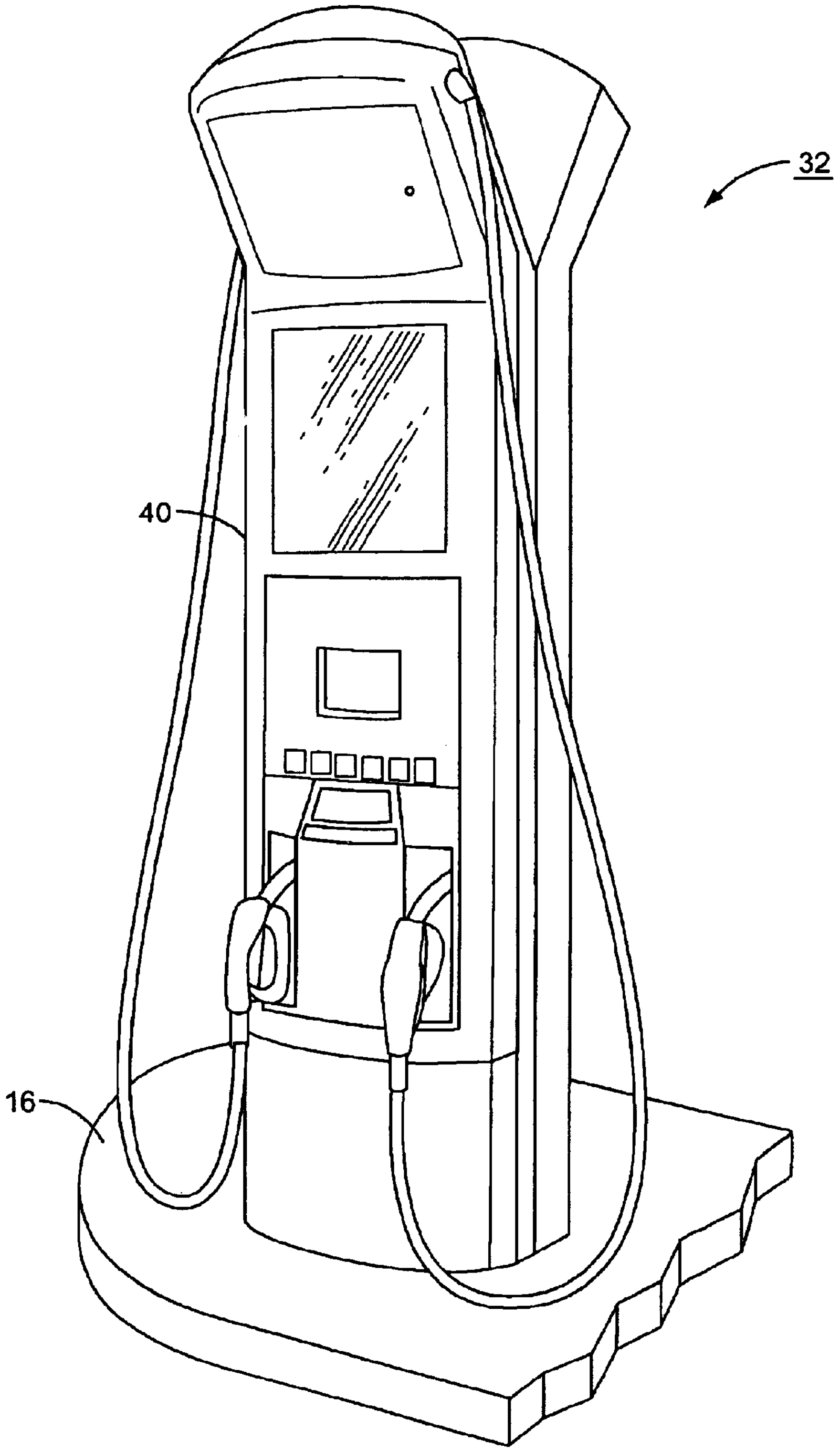
FIG. 2 illustrates an exemplary fuel dispenser such as may incorporate the present invention.

An exemplary fuel dispenser 32 is illustrated in FIG. 2. The fuel dispenser 32 sits on top of the fueling island 16 as is well understood and allows customers to purchase fuel therefrom as is conventional. The fuel dispenser 32 comprises a housing 40 that contains a fuel handling chamber (not shown) and an electronics cabinet (also not shown) therewithin.

Figure 3:
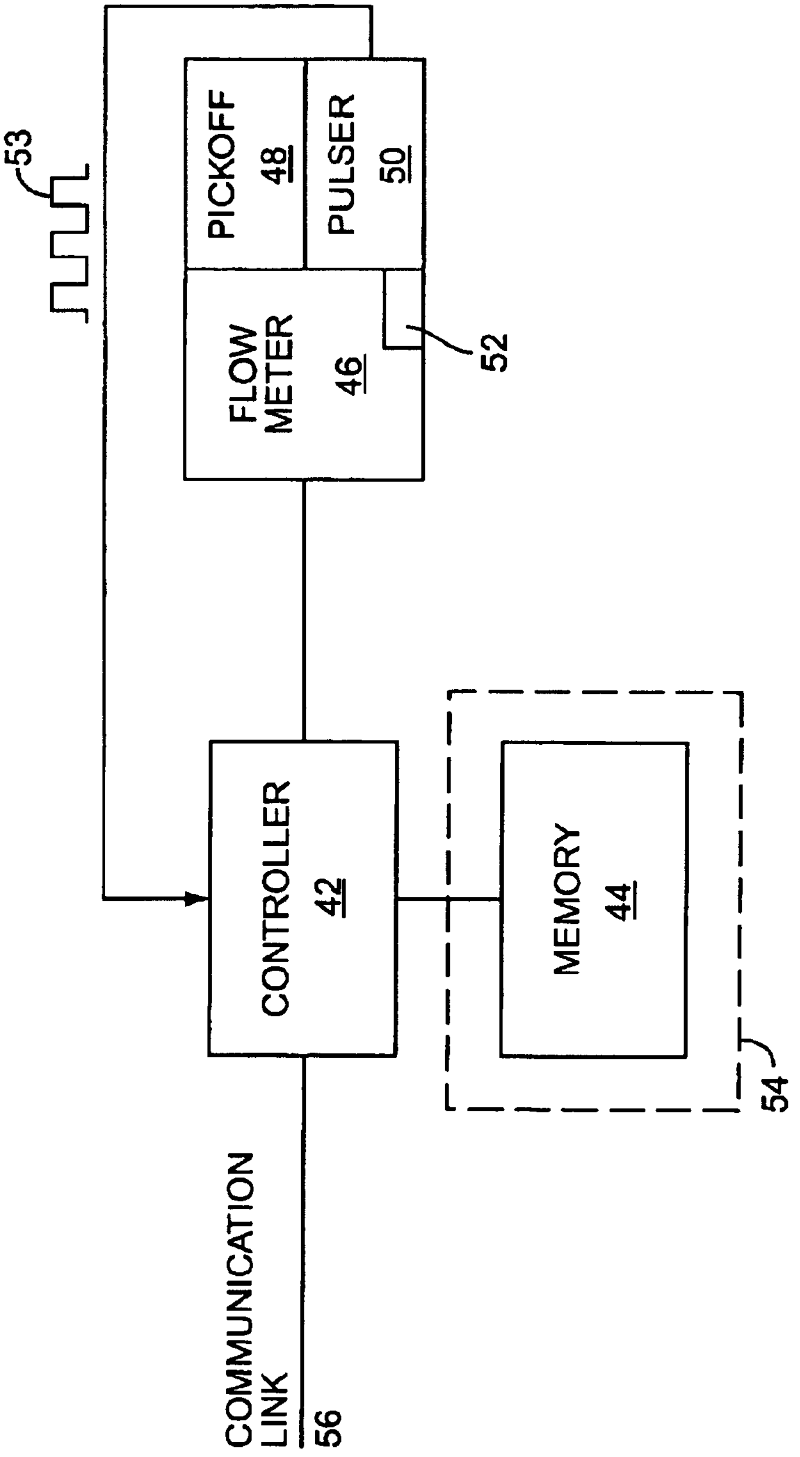
FIG. 3 illustrates a schematic of an exemplary embodiment of a flow meter coupled to the electronics of the fuel dispenser of FIG. 2.

As better illustrated in FIG. 3, the fuel dispenser 32 may comprise a controller 42 coupled to a memory device 44. The controller 42 is communicatively coupled to a flow meter 46. The flow meter 46 may comprise, as part of its constituent elements, a pickoff 48 and a pulser 50 as is conventional. The flow meter 46 may further comprise a memory device 52. During manufacturing, the flow meter 46 may be assigned a unique identifier and a calibration factor. These values are stored in the memory device 52. The memory device 52 may be associated with the other electronics of the flow meter 46 or isolated as needed or desired. Upon installation within a fuel dispenser 32, the unique identifier and the calibration factor are also stored in the memory device 44.

During operation, the pulser 50 sends a series of pulses 53 indicative of flow through the flow meter 46 to the controller 42. In an exemplary embodiment, each pulse represents 1/1000 gallons of fuel, although other gradations may exist. This is typically performed by a dedicated line to help prevent interruption or tampering.

The memory device 44 is stored in an isolated chamber 54 such that it is not readily accessible to tampering. This may comprise a welded chamber within the electronics cabinet of the fuel dispenser 32 or other comparable isolating mechanism. Further, the memory device 44 may be operatively isolated as well, such that it is impossible to write to memory device 44 without an appropriate password or the like. In an exemplary embodiment, the memory device 44 may be potted with a seal to prevent physical tampering.

For more information about a flow meter, reference is made to the previously incorporated U.S. Pat. No. 6,296,148 as well as commonly owned U.S. Pat. No. 6,092,410 and U.S. patent application Ser. No. 09/077,741, filed 08 Mar. 1999, now U.S. Pat. No. 6,250,151, both of which are hereby incorporated by reference in their entireties.

As alluded to above, the fuel dispenser 32 may further comprise a communication link 56 adapted to communicate with the site controller 26 or other site communicator as needed or desired. The communication link 56 may be an Ethernet cable or the like or could be wireless if needed or desired.

Figure 4:
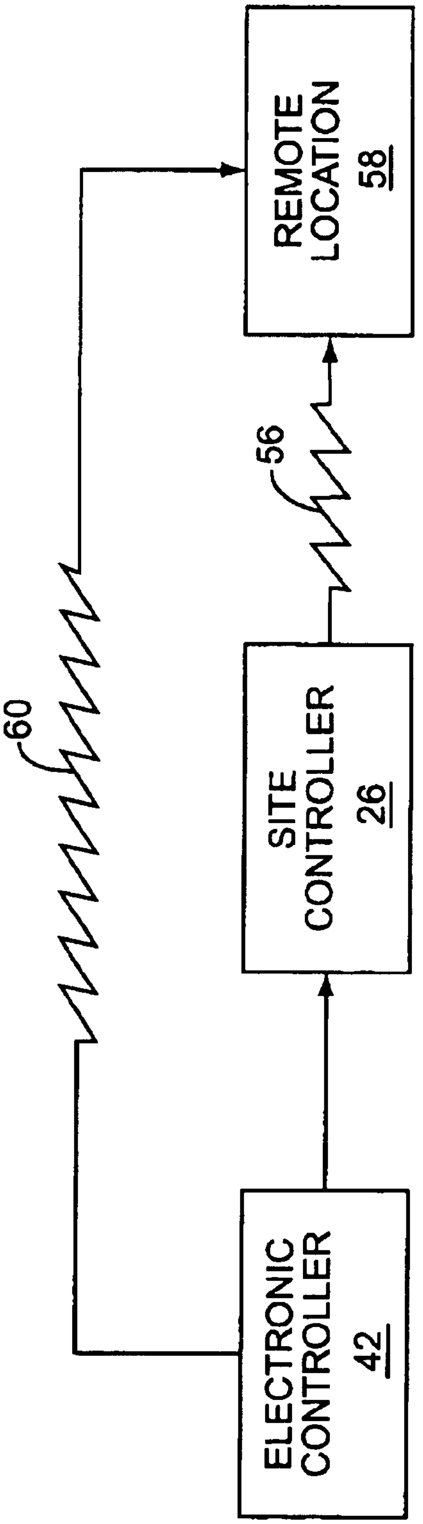
FIG. 4 illustrates a schematic diagram of the communication aspects of the present invention.

The communication links are illustrated schematically in FIG. 4. The controller 42 is communicatively coupled to the site controller 26 or the tank monitor 36 (or both). The controller 42 may communicate any of the data input thereto on to the site controller 26.

The site controller 26 may use any of this information for reporting or decision purposes. The site controller 26 may be communicatively coupled to a remote location 58 using a communication link 56', such as the Public Service Telephone Network (PSTN) or the Internet, for example. Communication link 56' may be the same as or in addition to off site communication link 28. Information is communicated by the electronic controller 42 to the site controller 26 and can also be communicated from the site controller 26 to the remote location 58 for any type of purpose such as logging, tracking information, or determining if any problems exist. The electronic controller 42 may alternatively or additionally be directly communicatively coupled to the remote location 58 via a communication link 60, instead of only being coupled to the site controller 26, in the event that it is desired for the electronic controller 42 to communicate information directly to the remote location 58 without first being communicated through the site controller 26. The communication links 56, 60 may be wired or may be comprised of a medium used in wireless communications, such as radiofrequency communication.

Figure 5:
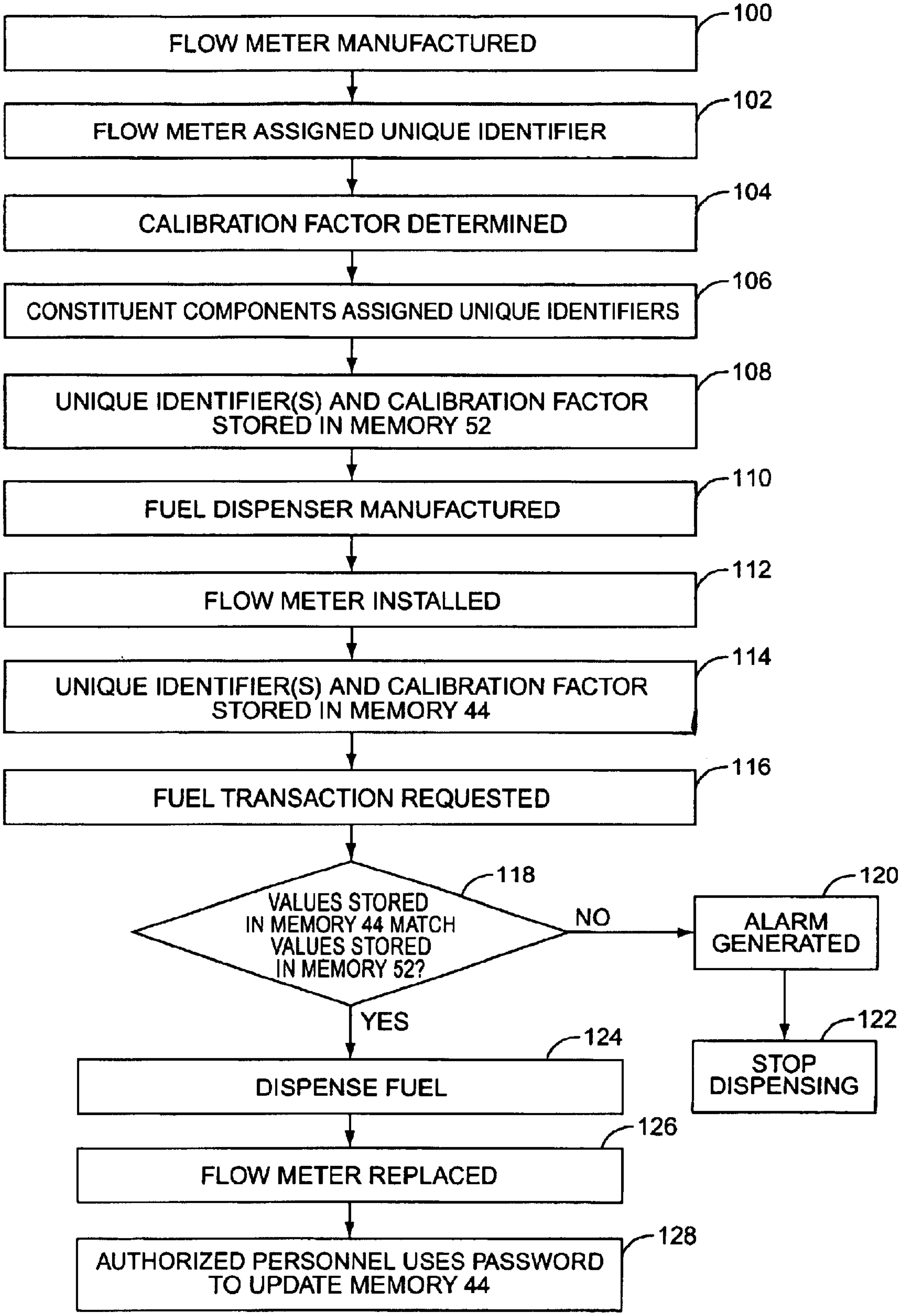
FIG. 5 illustrates a flow chart of an exemplary embodiment of the present invention.

FIG. 5 illustrates the methodology of an exemplary embodiment of the present invention presented in a flow chart format. In particular, the flow meter 46 is manufactured (block 100). During manufacturing, the flow meter 46 is assigned a unique identifier (block 102). Likewise, a calibration factor is determined (block 104). Determinations of calibration factors for flow meters 46 are well understood. Note that it is possible that the calibration factor and the unique identifier may be the same number and only stored once if the calibration factor is unique. If the calibration factor is reused on multiple flow meters 46, two numbers must be stored.

Optionally, the constituent elements of the flow meter 46 may be assigned unique identifiers (block 106). The constituent elements may be the pickoff 48 and/or the pulser 50 or the like. The unique identifiers and the calibration factor are stored in the memory device 52 of the flow meter 46 (block 108).

The fuel dispenser 32 is manufactured (block 110). During manufacturing, a flow meter 46 is installed in the fuel dispenser 32 (block 112). The flow meter 46 may be manufactured by a third party relative to the manufacturer of the fuel dispenser 32, or the flow meter 46 may be manufactured by the same entity. Likewise, the manufacturing of the fuel dispenser 32 may be concurrent with the manufacturing of the flow meter 46 if needed or desired.

The unique identifier(s) and calibration factor are then stored in memory device 44 of the fuel dispenser 32 (block 114). As previously noted, the storage of data in the memory device 44 may be accomplished with a password, or the protection of the memory device 44 may occur after the unique identifier(s) and calibration factor have been stored therein.

The fuel dispenser 32 is then installed in a fueling environment 10 as is conventional, and fueling transactions may begin to be requested during the normal operation of the fueling environment 10 (block 116). The controller 42 of the fuel dispenser 32 compares the values stored in the memory device 44 with the values stored in the memory device 52 to see if there is a match (block 118). In the event that the answer to block 118 is no, the values do not match, an alarm may be generated (block 120). This alarm may be reported to the site controller 26, the tank monitor 36 or other site communicator for off site reporting. In one embodiment, the alarm generates a service call from an authorized service representative of the dispenser manufacturer. Likewise, a report may be generated for the appropriate regulatory agency such as a Bureau of Weights and Measurements. Other alarms to the management system of the fueling environment 10 may be generated. The management system may be off site. Further, the alarm may be discemable to the fueling environment 10 operator if needed or desired. The reports and/or off site alarms may be sent through the off site communication links 28 or 38 as needed or desired. Concurrently with the generation of the reports and/or alarms, the fuel dispenser 32 may be instructed to stop dispensing fuel until the condition which caused the alarm is rectified (block 122).

However, if the answer to block 118 is yes, the values in the respective memories match, the fuel dispenser 32 dispenses fuel as is conventional (block 124) and the customer is billed for fuel dispensed as is well understood.

At some point, the fuel dispenser 32 may legitimately need the flow meter 46 replaced. This may occur due to unacceptable calibration drift due to wear on the components of the flow meter 46 or other operational problems. Regardless of the reason, the flow meter 46 is legitimately replaced (block 126). At that time, an authorized service representative of the manufacturer or installer visits the fueling environment 10 and replaces the flow meter 46. The authorized personnel also uses a password to access the memory device 44 to erase or overwrite the original values stored therein and replace them with the values of the new flow meter 46 (block 128). This may be done through a software program accessible by the service personnel during a service call. The software may be resident on the fuel dispenser 32 or on a portable interface (such as a special purpose laptop computer—not shown) that the service technician carries for each service call. As yet another alternative, the software may be located at a remote location with an interface provided thereto through the fuel dispenser 32 or the portable interface. Optionally, if an improper password is ever used in an attempt to access the memory device 44, an alarm may be generated and the fuel dispenser 32 shut down as needed or desired. As yet another security measure, the password to access the memory device 44 may periodically be changed.

Before the authorized service representative is provided the password, the service representative may have to prove that he is authorized to receive the password, especially in an instance when the password is not delivered to the service representative in person. Such proof may be challenge and password, an employee number, or the like as needed or desired.

Those skilled in the art will recognize improvements and modifications to the preferred embodiments of the present invention. All such improvements and modifications are considered within the scope of the concepts disclosed herein and the claims that follow.

What is claimed is:

1. A method for preventing unauthorized fuel dispenser flow meter replacement, comprising:

storing a unique identifier associated with the flow meter in a flow meter memory;

storing the unique identifier in a fuel dispenser memory;

prior to performing a fueling transaction, comparing the unique identifiers stored in the flow meter memory and the fuel dispenser memory; and precluding fuel dispensing in the event that the unique identifiers do not match.

2. The method of claim 1, further comprising storing a calibration factor in the flow meter memory and the fuel dispenser memory; and comparing the calibration factors in the flow meter memory and the fuel dispenser memory prior to authorizing any fueling transaction.

3. The method of claim 1, further comprising providing unique identifiers for constituent elements of the flow meter.

4. The method of claim 3, further comprising comparing the unique identifiers of the constituent elements with unique identifiers previously stored in the fuel dispenser memory prior to authorizing a fueling transaction.

5. The method of claim 1, further comprising generating an alarm remotely from a fueling environment in which the fuel dispenser is located.

6. The method of claim 5, wherein generating an alarm remotely comprises generating an alarm at a regulatory agency.

7. The method of claim 5, wherein generating an alarm remotely comprises using a site communicator to generate an alarm remotely.

8. The method of claim 1, further comprising providing a password to access the fuel dispenser memory and change the unique identifier stored therein.

9. The method of claim 8, further comprising providing the password to an authorized representative for flow meter replacement.

10. The method of claim 8, further comprising changing the password within the fuel dispenser memory.

11. A fuel dispenser, comprising:

a flow meter, comprising constituent elements, and a flow meter memory having a unique identifier stored therein;

a fuel dispenser memory having a second unique identifier stored therein, said second unique identifier corresponding to the unique identifier of the flow meter; and a controller adapted to compare the unique identifiers in the flow meter memory and the fuel dispenser memory prior to authorizing a fueling transaction.

12. The fuel dispenser of claim 11, further comprising a communication link adapted to communicate with a site communicator.

13. The fuel dispenser of claim 11, further comprising a unique identifier for each constituent element of the flow meter.

14. The fuel dispenser of claim 13, wherein the unique identifiers of the constituent elements are also stored in the fuel dispenser memory.

15. The fuel dispenser of claim 14, wherein the controller is further adapted to compare the unique identifiers of the constituent elements with the unique identifiers stored in the fuel dispenser memory prior to authorizing the fueling transaction.

16. The fuel dispenser of claim 11, wherein said flow meter memory further comprises a calibration factor stored therein.

17. The fuel dispenser of claim 16, wherein said fuel dispenser memory comprises said calibration factor stored therein.

18. The fuel dispenser of claim 17, wherein the controller compares said calibration factors stored in both of said memories.

19. The fuel dispenser of claim 11, wherein said controller receives a password to access the fuel dispenser memory and changes the unique identifier stored therein.

20. A site communicator, comprising:

a remote communication link adapted to report information concerning a fueling environment in which the site communicator is located off site; and logic adapted to receive a signal from a fuel dispenser indicating that a unique identifier associated with a flow meter has not been matched during a comparing step prior to authorizing a fueling transaction.

21. The site communicator of claim 20, wherein said site communicator comprises a tank monitor.

22. The site communicator of claim 20, wherein said site communicator comprises a site controller.

23. The site communicator of claim 20, wherein said remote communication link is communicatively coupled to a regulatory agency.

24. The site communicator of claim 20, wherein said remote communication link is adapted to report to an authorized manufacturer.

* * * * *

UNITED STATES PATENT AND TRADEMARK OFFICE

CERTIFICATE OF CORRECTION

PATENT NO. : 6,882,941 B2 
DATED : April 19, 2005
INVENTOR(S) : Seifollah S. Nanaji, Brent K. Price and David S. Shuttleworth It is certified that error appears in the above-identified patent and that said Letters Patent is hereby corrected as shown below:

Title page,
Item [73], Assignee, should read -- Gilbarco Inc., Greensboro, NC (US) --

Signed and Sealed this

Twenty-eighth Day of June, 2005

JON W. DUDAS
*Director of the United States Patent and Trademark Office*